United States Patent
Coppola et al.

(10) Patent No.: US 11,916,446 B2
(45) Date of Patent: Feb. 27, 2024

(54) ROTOR ASSEMBLY WITH SOLID LOW FRICTION LAYER AND PRESS-FIT SLEEVE

(71) Applicant: GM GLOBAL TECHNOLOGY OPERATIONS LLC, Detroit, MI (US)

(72) Inventors: Anthony Michael Coppola, Rochester Hills, MI (US); Alireza Fatemi, Canton, MI (US); Derek Frei Lahr, Howell, MI (US); Kestutis A. Sonta, Troy, MI (US); Alan G. Holmes, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 113 days.

(21) Appl. No.: 17/537,123

(22) Filed: Nov. 29, 2021

(65) Prior Publication Data

US 2023/0170772 A1   Jun. 1, 2023

(51) Int. Cl.
| | |
|---|---|
| *H02K 1/28* | (2006.01) |
| *H02K 15/02* | (2006.01) |
| *H02K 1/2791* | (2022.01) |
| *B29C 65/56* | (2006.01) |
| *B29L 31/00* | (2006.01) |

(52) U.S. Cl.
CPC ......... *H02K 15/028* (2013.01); *B29C 65/565* (2013.01); *H02K 1/2791* (2022.01); *B29L 2031/7498* (2013.01)

(58) Field of Classification Search
CPC combination set(s) only.
See application file for complete search history.

(56) References Cited

U.S. PATENT DOCUMENTS

| | | | |
|---|---|---|---|
| 2004/0189125 A1* | 9/2004 | Doemen | F16C 17/08 310/90 |
| 2013/0113324 A1* | 5/2013 | Shepard | H02K 15/03 29/598 |
| 2017/0284219 A1* | 10/2017 | Hunter | F01D 17/146 |
| 2021/0142936 A1* | 5/2021 | Tyler | H01F 7/13 |

OTHER PUBLICATIONS

U.S. Appl. No. 17/445,739, filed Aug. 24, 2021, Fatemi et al.

* cited by examiner

*Primary Examiner* — Thomas Truong

(57) ABSTRACT

A rotor for an electric machine includes a rotor assembly having an outer surface and including a plurality of poles with permanent magnets. A solid layer is formed on the outer surface of the rotor assembly and has an outer surface with a first coefficient of friction that is lower than a second coefficient of friction of the outer surface of the rotor assembly. The rotor includes an outer sleeve. The rotor assembly is press-fit into the outer sleeve.

20 Claims, 3 Drawing Sheets

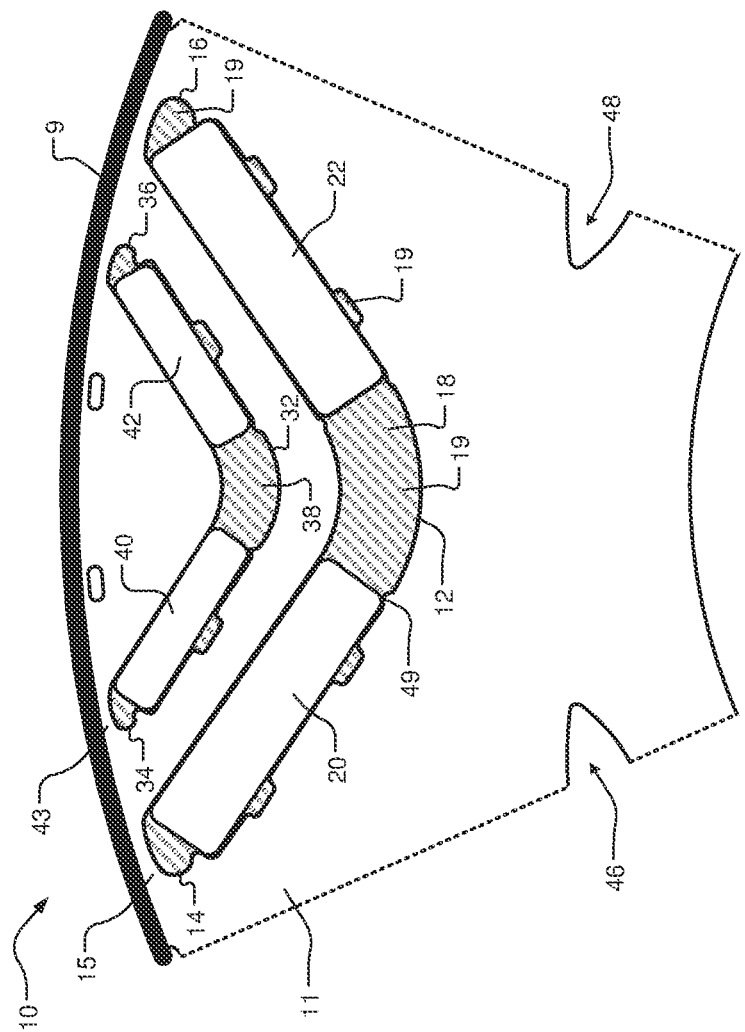
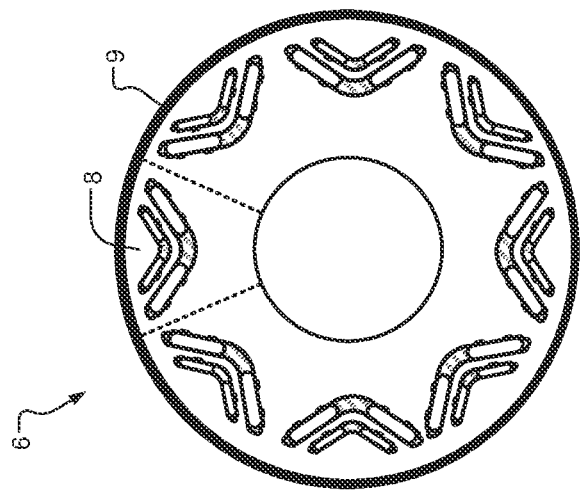
FIG. 1B
FIG. 1A

ROTOR ASSEMBLY WITH SOLID LOW FRICTION LAYER AND PRESS-FIT SLEEVE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric machines, and more particularly to electric machines including rotor assemblies with press-fit sleeves.

Electric vehicles such as battery electric vehicles (BEVs), fuel cell vehicles, and hybrid vehicles include one or more electric machines that are operated as motors to propel the vehicle. The battery system can be recharged using utility power, by another vehicle, during regeneration and/or by an internal combustion engine (for hybrid vehicle applications). During operation of the hybrid and/or electric vehicle, power that is generated during braking of the vehicle may be used to recharge a battery system of the vehicle. Instead of braking the vehicle using mechanical brakes, the motor is operated as a generator to brake the vehicle and to generate power that is used to recharge the battery system.

Some electric machines include a rotor assembly that includes permanent magnets. The rotor assembly rotates within a stator during operation as a motor to produce torque or as a generator to produce power. Web and bridge structures are typically used for structural support in magnetic flux pathways. As can be appreciated, the rotor assembly needs to be robust since it is stressed by mechanical, electrical and magnetic forces.

SUMMARY

A rotor for an electric machine includes a rotor assembly having an outer surface and including a plurality of poles with permanent magnets. A solid layer is formed on the outer surface of the rotor assembly and has an outer surface with a first coefficient of friction that is lower than a second coefficient of friction of the outer surface of the rotor assembly. The rotor includes an outer sleeve. The rotor assembly is press-fit into the outer sleeve.

In other features, the solid layer has a thickness that is less than or equal to 0.2 mm. The outer sleeve comprises carbon fiber. The solid layer comprises a polymer material. The polymer material includes thermoplastic material. The thermoplastic material is selected from a group consisting of polybenzimidazole, polytetrafluoroethylene, and polyoxymethylene.

In other examples, the solid layer comprises a thermoset material. The thermoset material is selected from a group consisting of epoxy, phenolic and polyurethane.

In other features, a lubricating additive is added to the polymer material. The lubricating additive is selected from a group consisting of graphite, wax, and ceramic. The solid layer has a compressive strength greater than or equal to 50 MPa and a thermal expansion coefficient less than or equal to 30 ppm/° C.

In other features, the solid layer comprises a ceramic material. The ceramic material is selected from a group consisting of tungsten disulfide, molybdenum disulfide, titanium nitride, and titanium carbide.

A method for manufacturing a rotor for an electric motor comprises providing a rotor assembly including a plurality of rotor portions and having an outer surface; and forming a solid layer on the outer surface of the rotor assembly. The solid layer has a first coefficient of friction than is lower than a second coefficient of friction of the outer surface of the rotor assembly. The method includes press-fitting the rotor assembly into an outer sleeve.

In other features, the method includes performing at least one of grinding, sanding and machining of an outer surface of the solid layer prior to the press-fitting. The method includes applying lubricant to an outer surface of the solid layer prior to the press-fitting.

In other features, the method includes cooling the rotor assembly to a temperature less than or equal to −20° C. prior to the press-fitting.

In other features, the solid layer has a thickness that is less than or equal to 0.2 mm. The outer sleeve comprises carbon fiber. The solid layer comprises a thermoplastic selected from a group consisting of polybenzimidazole, polytetrafluoroethylene, and polyoxymethylene.

In other features, the solid layer comprises one of a thermoset selected from a group consisting of epoxy, phenolic and polyurethane; or ceramic selected from a group consisting of tungsten disulfide, molybdenum disulfide, titanium nitride, and titanium carbide.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a side view of an example of a rotor assembly including a press-fit sleeve;

FIG. 1B is a side view of an example of a pole portion of a rotor assembly including a press-fit sleeve;

In the drawings, reference numbers may be reused to identify similar and/or identical elements.

DETAILED DESCRIPTION

Figure 2B:
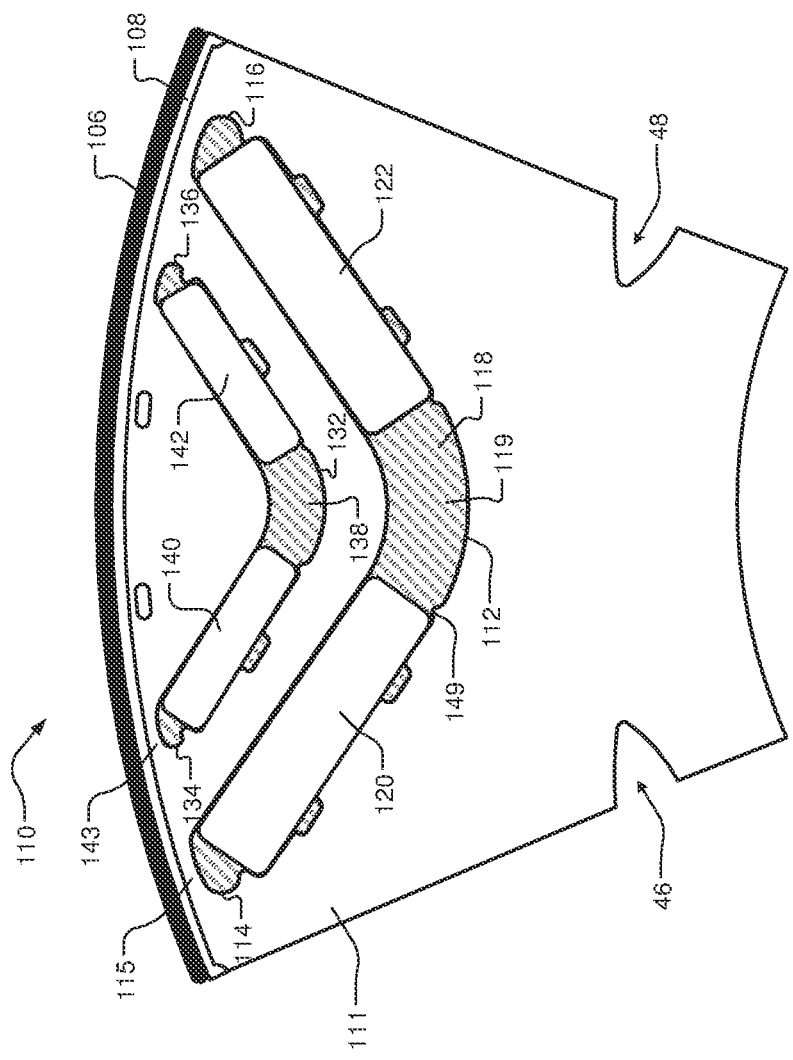
FIG. 2B is a side view of a pole portion of an example of a rotor assembly including an outer sleeve arranged over a solid low friction layer according to the present disclosure.

A rotor assembly according to the present disclosure for an electric machine is reinforced by an outer sleeve. The rotor assembly is press-fit into the outer sleeve during assembly. The rotor assembly includes a solid low friction layer formed on an outer surface of laminations of the rotor assembly to assist with press-fitting. In some examples, the outer sleeve is made of carbon fiber (CF). Prior to press fitting the outer sleeve, the solid low friction layer is applied to the outer surface of the rotor assembly at the rotor-sleeve interface to reduce friction and improve the ease of assembly of the press-fit sleeve onto the rotor assembly.

The solid low friction layer allows lower force to be used during assembly. This, in turn, reduces fabrication cost of the rotor assembly by reducing the likelihood of damage to the sleeve and/or the rotor assembly during the assembly process. The approach described herein also enables the use of higher press-stress in the sleeve to be achieved by press-fitting since the likelihood of stress/damage caused by friction is reduced. Furthermore, press-fitting of the sleeve onto the rotor assembly with the low friction outer layer is more cost effective and manufacturing friendly than other processes involving direct winding of the sleeve onto the rotor assembly.

Referring now to FIGS. 1A and 1B, an example of a rotor assembly 6 is shown. In FIG. 1A, the rotor assembly 6 is shown to include multiple poles 8 and an outer sleeve 9 such as a carbon fiber sleeve. In FIG. 1B, an example of a rotor portion 10 of the rotor assembly 6 is shown. In this example, the rotor portion 10 corresponds to a single pole and the rotor assembly 6 includes 8 poles, although additional or fewer poles can be used.

The rotor portion 10 includes a plurality of laminations 11 defining a first "V"-shaped opening 12 and a second "V"-shaped opening 32. Bridge structures 15 are located across radially outer portions 14 and 16 of the first "V"-shaped opening 12. Permanent magnets 20 and 22 are located in the first "V"-shaped opening 12 between the bridge structures 15 and a central portion 18 of the first "V"-shaped opening 12.

Bridge structures 43 are located across radially outer portions 34 and 36 of the second "V"-shaped opening 32. Permanent magnets 40 and 42 are located in the second "V"-shaped opening 32 between the bridge structures 43 and a central portion 38 of the second "V"-shaped opening 32.

In this example, the rotor portion 10 is webless. In other examples, the rotor portion 10 includes web structures (not shown). Fill material 19 is arranged in the central portion 18 and other open areas of the first "V"-shaped opening 12 and the second "V"-shaped opening 32. In some examples, the fill material 19 includes polymer although other materials can be used.

The plurality of laminations 11 may include notches 46 and 48 located on opposite sides thereof. Projections 49 that extend into the first and second "V"-shaped openings 12 and 32 may be used to help position the permanent magnets 20, 22, 40 and/or 42 therein.

The outer sleeve 9 has an interference fit onto the plurality of laminations 11 to reinforce the rotor assembly 6. The outer sleeve 9 generates tensile stress in the outer sleeve 9 and compressive stress in the lamination and the polymeric material. This ensures deflection of the rotor assembly is sufficiently low to avoid striking the stator. Compression stress in the lamination typically requires webs, magnets, or polymers to support the load.

In some examples, the permanent magnets 20, 22, 40, and 42 have ~0.1 mm clearance with the first and second "V"-shaped openings in the laminations to allow insertion. Adding the outer sleeve 9 increases the effective air gap between the rotor and stator.

As can be appreciated, sleeves such as the outer sleeve 9 should provide compressive force. Therefore, the rotor assembly 6 is press-fit into the sleeve. Advantages of this approach include the fact that sleeves can be mass-produced. Interference stress is relatively straight-forward to generate and press-fitting is an assembly line-friendly process. Challenges with this approach include high levels of interference that can be challenging during press-fitting without damaging the sleeve.

Figure 2A:
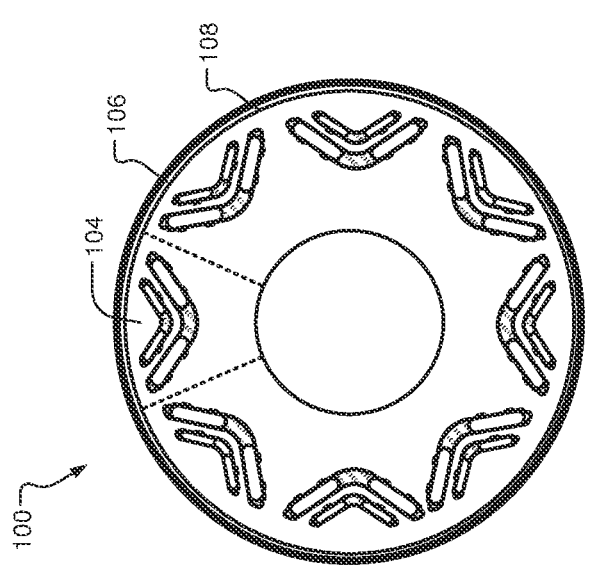
FIG. 2A is a side view of an example of a rotor assembly including a press-fit sleeve arranged over a solid low friction layer according to the present disclosure.

Referring now to FIGS. 2A and 2B, an example of a rotor assembly 100 is shown. In FIG. 2A, the rotor assembly 100 is shown to include multiple poles 104 and an outer sleeve 106 (such as a carbon fiber sleeve) arranged over a solid low friction layer 108. In FIG. 2B, an example of a rotor portion 110 of the rotor assembly 100 is shown. In this example, the rotor portion 110 corresponds to a single pole and the rotor assembly 100 includes 8 poles, although additional or fewer poles can be used.

The rotor portion 110 includes a plurality of laminations 111 defining a first "V"-shaped opening 112 and a second "V"-shaped opening 132. Bridge structures 115 are located across radially outer portions 114 and 116 of the first "V"-shaped opening 112.

In this example, the rotor assembly 100 includes bridges and is webless. In other examples, the rotor assembly 100 includes web structures (not shown) or the rotor assembly is both bridgeless and webless. Fill material 119 is located between the permanent magnets in the central opening 118 and in other open areas in the "V"-shaped openings. Permanent magnets 120 and 122 are located in the first "V"-shaped opening 112 between bridge structures 115 and the central opening 118 (or web structures if they are used).

Bridge structures 143 are located across radially outer portions 134 and 136 of the second "V"-shaped opening 132. Permanent magnets 140 and 142 are located in the second "V"-shaped opening 132 between the bridge structures 143 and a central portion 138 of the second "V"-shaped opening 132 (or web structures if they are used).

The plurality of laminations 111 may include notches 146 and 148 located on opposite sides thereof. In some examples, one or more projections 149 that extend inwardly into the first and second "V"-shaped openings 112 and 132 may be used to position the permanent magnets 120, 122, 140 and 142. If used, the projections 149 can extend from one or both facing surfaces of the first and second "V"-shaped openings 112 and 132 as shown in FIGS. 1B and 2B.

The solid low friction layer 108 is formed on an outer surface of the rotor portion 110. The outer sleeve 106 has an interference fit onto the solid low friction layer 108 to reinforce the rotor assembly 100. Press-fitting the outer sleeve 106 generates tensile stress in the outer sleeve 106 and compressive stress in the laminations and fill material. This ensures deflection of the rotor is sufficiently low to avoid striking the stator.

In some examples, the permanent magnets typically have ~0.1 mm clearance with the openings in the laminations to allow insertion. Adding the outer sleeve 106 increases the effective air gap between the rotor and stator.

Figure 3:
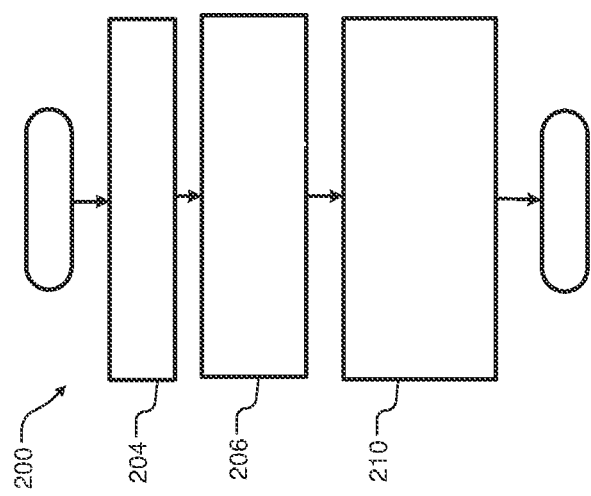
FIG. 3 is a flowchart of an example of a method for forming a solid low friction layer on an outer surface of the rotor assembly of FIG. 2B according to the present disclosure.

Referring now to FIG. 3, a method 200 for adding the solid low friction layer to the outer surface of the rotor portions of the rotor assembly is shown. At 204, the rotor assembly is assembled. In some examples, the laminations are stamped, arranged, and bonded together using adhesive and/or mechanical interlocks. The permanent magnets are inserted into the "V"-shaped openings and the fill material is arranged in open areas using a mold or other process.

At 208, the solid low friction layer is formed on an outer surface of the rotor assembly (e.g. radially outer surfaces of the laminations). At 210, the outer surface of the solid low friction layer is optionally ground, polished and/or machined if needed. The grinding, polishing or machining may be performed to provide a desired outer shape and/or to reduce friction of the outer layer.

The solid low friction layer is formed on the outer surface of the rotor assembly before press-fitting on the outer sleeve. One purpose of the outer sleeve is to reduce friction during the press-fitting procedure to avoid damage to either the rotor assembly or the sleeve. The solid low friction layer can be formed on the rotor assembly using a molding procedure such as transfer molding or injection molding. After curing, the molding material is cured and becomes a solid, low friction layer. For example, similar methods are used to create slot insulation in stator cores. In some examples, adhesion of an epoxy layer on the rotor assembly is aided by use of a coupling agent such as a silane.

Alternate procedures for creating the polymer layer include dip coating, spray coating or other processes. However, the alternative methods generally result in less strong/stiff coatings. Coatings are also generally less uniform and typically require machining (rather than it being optional in the case of the molding procedure). After applying the layer, the layer is cured or allowed to dry into a solid low friction layer.

After applying the solid low friction layer, a grinding/polishing procedure can be used to smooth and round the layer further. In some examples, careful machining of the outer surface of the rotor assembly may be performed although care must be taken to avoid shorting of the laminations.

In some examples, the thickness of the solid low friction layer is sufficient to fill in the distance from the lowest to the highest point on the rotor surface (relative to the radial distance from rotor center axis). In some examples, the solid low friction layer has a coefficient of friction that is less than the outer surface of the laminations of the rotor assembly. In other examples, the solid low friction layer has a coefficient of friction that is less than 0.1. In some examples, the solid low friction layer is very smooth and hard to avoid deform under pressure.

In some examples, the solid low friction layer has a thickness of less than 0.2 mm. The solid low friction layer includes a polymeric material. In some examples, the polymeric material includes thermoplastic. Non-limiting examples of suitable thermoplastics include polybezimidazole, polytetrafluoroethylene, polyoxymethylene or other thermoplastics.

In some examples, the solid low friction layer includes a thermoset. Suitable examples of the thermoset include epoxy, phenolic, polyurethane or other thermoset. In other examples, the polymeric material includes lubricating additives such as graphite, waxes, ceramics, or other suitable lubricating additives.

In some examples, since the outer sleeve provides compressive force, the polymeric layer has a compressive strength of 50 MPa and a thermal expansion coefficient of less than 30 ppm/° C. In other examples, the solid low friction layer includes ceramic. Suitable ceramics include tungsten disulfide, molybdenum disulfide, titanium nitride, titanium carbide or other suitable ceramic. In some examples, the solid low friction layer is adhered to the rotor assembly surface by chemical adhesion.

In some examples, an additional lubricant, such as grease or oil, is applied to an outer surface of the low friction surface to further reduce friction. In some examples, the rotor is cooled to a temperature of −20° C. or below (any temp from −20° C. to −200° C. would be beneficial) to shrink an outer diameter of the rotor assembly to aid in the press-fit operation.

Figure 4:
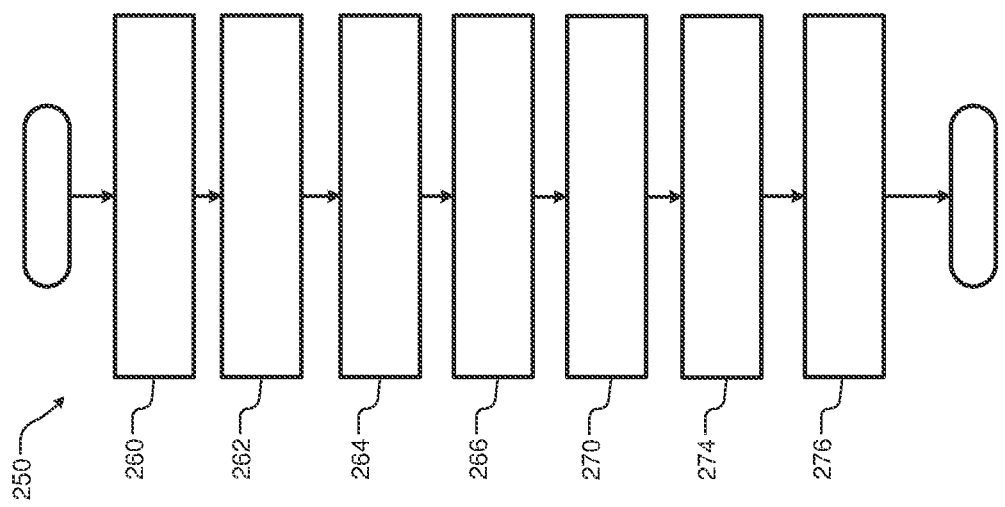
FIG. 4 is a flowchart of an example of a method for press-fitting the rotor assembly into the outer sleeve.

In FIG. 4, a method 250 for manufacturing the rotor assembly involves creating the outer sleeve and then press fitting the rotor assembly into the sleeve. At 260, the method includes winding filaments such as carbon fiber around a mandrel in the shape of the outer surface of the rotor assembly. At 262, resin is applied to the filaments and then cured. At 264, the sleeve is removed from the mandrel. At 266, the sleeve is cut to a predetermined length corresponding to an axial length of the rotor assembly. At 270, the rotor assembly with the low friction outer layer is press fit into the sleeve.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A rotor for an electric machine, comprising:
   a rotor assembly having an outer surface and a plurality of poles with permanent magnets, the permanent magnets located in openings of the rotor assembly and positioned radially inwards from the outer surface;
   a solid layer formed on the outer surface of the rotor assembly and radially outwards from the permanent magnets, the solid layer having an outer surface with a first coefficient of friction that is lower than a second coefficient of friction of the outer surface of the rotor assembly; and
   an outer sleeve,
   wherein the rotor assembly is press-fit into the outer sleeve.

2. The rotor assembly of claim 1, wherein the solid layer has a thickness that is less than or equal to 0.2 mm.

3. The rotor assembly of claim 1, wherein the outer sleeve comprises carbon fiber.

4. The rotor assembly of claim 1, wherein the solid layer comprises a polymer material.

5. The rotor assembly of claim 4, wherein the polymer material includes thermoplastic material.

6. The rotor assembly of claim 5, wherein thermoplastic material is selected from a group consisting of polybenzimidazole, polytetrafluoroethylene, and polyoxymethylene.

7. The rotor assembly of claim 5, wherein the solid layer has a compressive strength greater than or equal to 50 MPa and a thermal expansion coefficient less than or equal to 30 ppm/° C.

8. The rotor assembly of claim 4, wherein a lubricating additive is added to the polymer material.

9. The rotor assembly of claim 8, wherein the lubricating additive is selected from a group consisting of graphite, wax, and ceramic.

10. The rotor assembly of claim 1, wherein the solid layer comprises a thermoset material.

11. The rotor assembly of claim 10, wherein the thermoset material is selected from a group consisting of epoxy, phenolic and polyurethane.

12. The rotor assembly of claim 1, wherein the solid layer comprises a ceramic material.

13. The rotor assembly of claim 12, wherein the ceramic material is selected from a group consisting of tungsten disulfide, molybdenum disulfide, titanium nitride, and titanium carbide.

14. A method for manufacturing a rotor for an electric motor, comprising:
providing a rotor assembly including a plurality of rotor portions with permanent magnets and having an outer surface, the permanent magnets located in openings of the rotor assembly and positioned radially inwards from the outer surface;
forming a solid layer on the outer surface of the rotor assembly and radially outwards from the permanent magnets,
wherein the solid layer has a first coefficient of friction than is lower than a second coefficient of friction of the outer surface of the rotor assembly; and
press-fitting the rotor assembly into an outer sleeve.

15. The method of claim 14, further comprising performing at least one of grinding, sanding and machining of an outer surface of the solid layer prior to the press-fitting.

16. The method of claim 14, further comprising applying lubricant to an outer surface of the solid layer prior to the press-fitting.

17. The method of claim 14, further comprising cooling the rotor assembly to a temperature less than or equal to −20° C. prior to the press-fitting.

18. The method of claim 14, wherein:
the solid layer has a thickness that is less than or equal to 0.2 mm; and
the outer sleeve comprises carbon fiber.

19. The method of claim 14, wherein the solid layer comprises a thermoplastic selected from a group consisting of polybenzimidazole, polytetrafluoroethylene, and polyoxymethylene.

20. The method of claim 14, wherein the solid layer comprises one of:
a thermoset selected from a group consisting of epoxy, phenolic and polyurethane; or
ceramic selected from a group consisting of tungsten disulfide, molybdenum disulfide, titanium nitride, and titanium carbide.

\* \* \* \* \*